(12) United States Patent
Ducci et al.

(10) Patent No.: US 6,523,585 B1
(45) Date of Patent: Feb. 25, 2003

(54) ANTISTATIC TIRE

(75) Inventors: Stefano Ducci, Rome (IT); Yochiro Kondo, Tokyo (JP); Paolo Straffi, Rome (IT); Jose Silicani, Grottaferrata (IT)

(73) Assignee: Bridgestone Corporation, Tokyo (JP)

( * ) Notice: Subject to any disclaimer, the term of this patent is extended or adjusted under 35 U.S.C. 154(b) by 48 days.

(21) Appl. No.: 09/605,935

(22) Filed: Jun. 28, 2000

Related U.S. Application Data

(63) Continuation-in-part of application No. 09/040,074, filed on Mar. 17, 1998, now abandoned.

(30) Foreign Application Priority Data

Mar. 18, 1997 (IT) .......................................... TO97A0230
Mar. 18, 1997 (IT) .......................................... TO97A0229

(51) Int. Cl.[7] .......................... B60C 1/00; B60C 11/00; B60C 11/01; B60C 19/08
(52) U.S. Cl. ................. 152/152.1; 152/209.5; 152/209.16; 152/525; 152/DIG. 2
(58) Field of Search ............................. 152/152.1, 209.5, 152/209.16, 525, DIG. 2

(56) References Cited

U.S. PATENT DOCUMENTS

| | | | |
|---|---|---|---|
| 2,339,546 A | 1/1944 | Hanson ........................ | 152/151 |
| 4,006,766 A | 2/1977 | Takayanagi et al. ...... | 152/209.5 |
| 4,152,186 A | 5/1979 | Shibata ........................ | 152/525 |
| 4,739,811 A | 4/1988 | Rampl ......................... | 152/209.5 |
| 5,518,055 A | 5/1996 | Teeple et al. ............... | 152/525 |
| 5,718,781 A | 2/1998 | Verthe et al. ............. | 152/152.1 |
| 5,872,178 A | 2/1999 | Kansupada et al. ....... | 152/152.1 |
| 5,898,047 A | 4/1999 | Howald et al. ........... | 152/152.1 |

FOREIGN PATENT DOCUMENTS

| | | |
|---|---|---|
| EP | 0 341 187 | 11/1989 |
| EP | 0 658 452 A1 | 12/1994 |
| EP | 0 681 931 A1 | 11/1995 |
| EP | 0 705 722 A1 | 4/1996 |
| EP | 0 718 126 A2 | 6/1996 |
| EP | 0 718 127 A1 | 6/1996 |
| EP | 0 754 574 A2 | 1/1997 |
| EP | 0 881 060 A2 | 2/1998 |
| EP | 0 872 360 A2 | 10/1998 |
| EP | 0 890 460 A1 | 1/1999 |
| EP | 0 872 360 A3 | 6/1999 |
| JP | 1-212602 | * 8/1989 |

* cited by examiner

Primary Examiner—Steven D. Maki
(74) Attorney, Agent, or Firm—Meredith E Palmer

(57) ABSTRACT

An antistatic tire having a tread made from a first mix (MP1) and having two annular shoulders and a peripheral rolling surface, two opposite annular portions of the rolling surface being defined by outer annular surfaces of the shoulders. Each shoulder is made from a second mix (MPC), which is electrically conducting, and which, under low strain, has substantially the same rigidity as the first mix (MP1), and, under high strain, has a greater rigidity than the first mix (MP1). In a second embodiment, an electrically conducting element is inserted inside the tread. The conducting element and the shoulders both being made of an electrically conducting third mix, which, under low strain and in the cured state, has the same mechanical characteristics as the first mix in the cured state, and, under high strain, has the same mechanical characteristics as the second mix in the cured state.

28 Claims, 3 Drawing Sheets

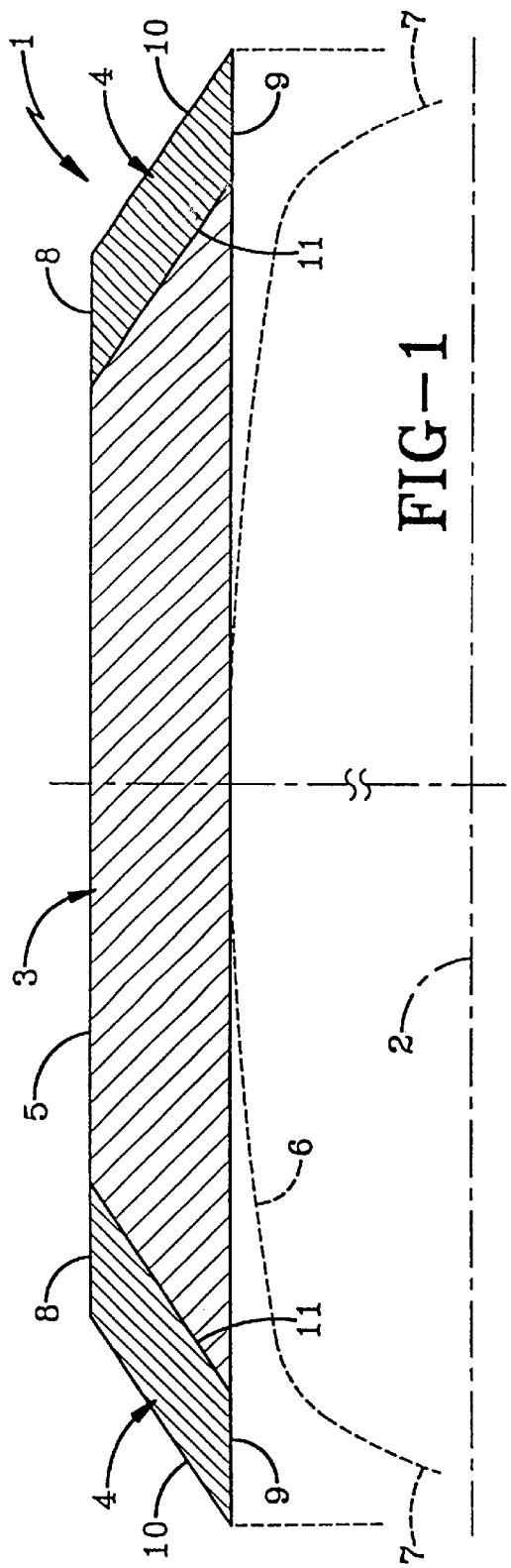
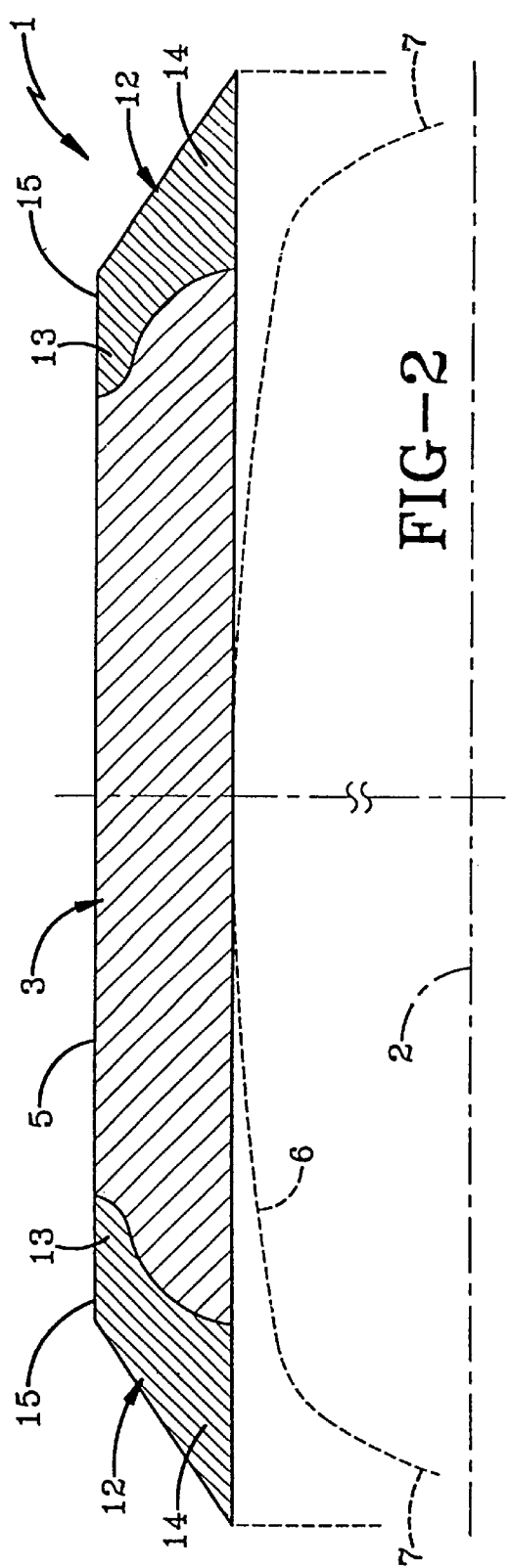

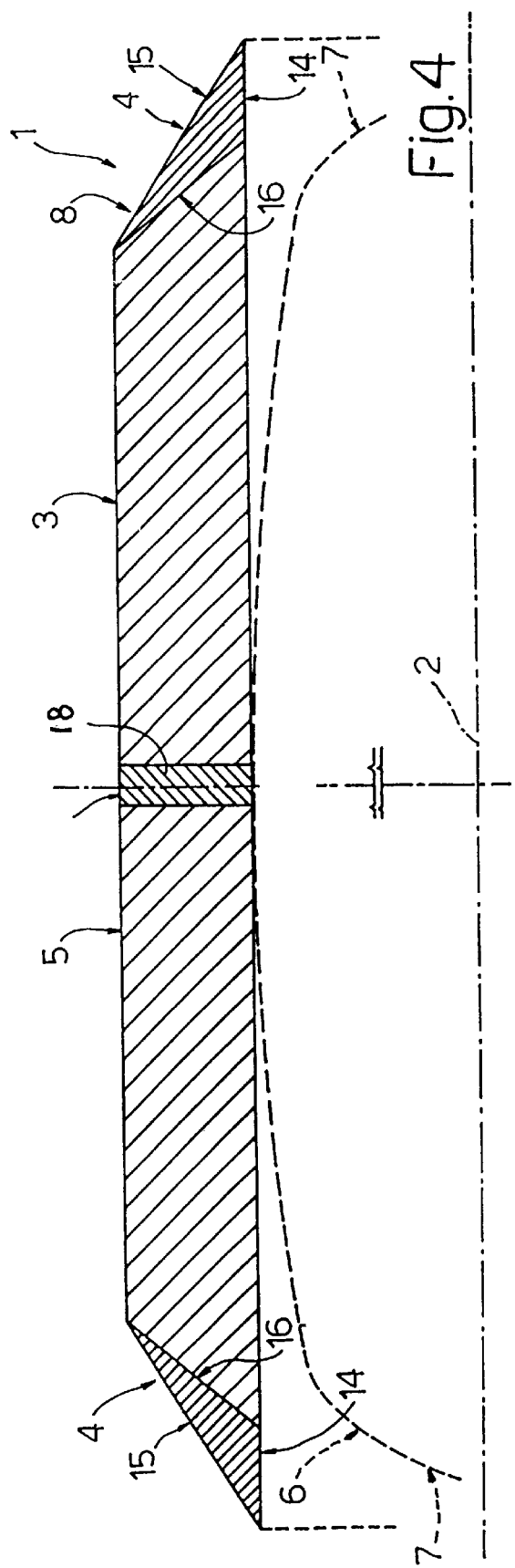

ANTISTATIC TIRE

CROSS REFERENCE TO RELATED APPLICATIONS

The present application is a continuation-in-part of U.S. Ser. No. 09/040,074, filed Mar. 17, 1998 now abandoned.

BACKGROUND OF THE INVENTION

1. Technical Field

The present invention relates to an antistatic tire. More specifically, the present invention relates to an antistatic tire of the type comprising electric current conducting elements incorporated in the tread and for grounding the static electricity of a vehicle.

2. Background Information

EP-A-718127 and EP-A-658452 relate to antistatic tires for grounding the static electricity of a vehicle, in which the tread and/or shoulders contain one or more electrically conducting elements defined laterally by a surface forming an annular portion of a rolling surface of the tread.

The tread and shoulders of a tire are normally made from different mixes, which react differently to the in-service stress to which they are subjected. That is, whereas the tread mix is designed to ensure a good dry and/or wet road-holding capacity, high resistance to wear and minimum rolling resistance, the. shoulder mix, which does not normally come into contact with the road surface, acts as an interface element between the tread mix and that of the sidewall (on the tire carcass), and therefore normally has the same physical and chemical characteristics as the sidewall mix.

In the event the shoulder mix comes into contact with the road surface, however, its physical and chemical characteristics must be compatible with those of both the tread and sidewall mixes.

In known antistatic tires, the above two mixes are combined with a third mix forming the electrically conducting elements, which, as stated, define a rolling surface portion of the tread.

The addition of a third mix, however, involves several drawbacks, due to the wear of the conducting mix normally differing from that of the mix from which the element incorporating the conducting mix is formed, thus resulting in uneven wear of the rolling surface of the tire, which in turn results in uneven wear of the tire, and in vibration and noise discernible from inside the passenger compartment of the vehicle.

Moreover, the use of three mixes, as provided for in the above documents—a first mix for the tread, a second for the shoulder, and a third conducting mix-seriously complicates the normal tread extrusion process by requiring the use of a relatively complex, high-cost, three-way extruder.

SUMMARY OF THE INVENTION

It is an object of the present invention to provide an antistatic tire designed to overcome the aforementioned drawbacks.

According to the present invention, there is provided an antistatic tire comprising a tread, two sidewalls, and two annular shoulders, each interposed between the tread and a respective said sidewall; the tread and the sidewalls being formed respectively from a first and second mix; and the tread defining part of a rolling surface, at least an annular portion of which is electrically conducting and has an electrical resistivity of less than $10^9$ ohms×cm; characterized in that said electrically conducting portion of the rolling surface is defined by the shoulders, each of which is formed from a third electrically conducting mix, which, under low strain and in the cured state, has substantially the same rigidity as said first mix in the cured state, and, under high strain, has a greater rigidity than said first mix in the cured state.

Preferably, according to one embodiment of the above tire, said third electrically conducting mix, under low strain and in the cured state, has substantially the same mechanical characteristics as said first mix in the cured state, and, under high strain, has substantially the same mechanical characteristics as said second mix in the cured state.

Also according to the present invention, there is provided an antistatic tire comprising a tread, two sidewalls, two annular shoulders, each interposed between the tread and a respective said sidewall, and an electrically conducting element; the tread and the sidewalls being formed respectively from a first and second mix; and the tread defining part of a rolling surface, at least an annular portion of which is defined by an annular surface of said electrically conducting element, which has an electrical resistivity of less than $10^9$ ohms×cm, and is inserted inside the tread; characterized in that the conducting element and the shoulders are both formed from a third electrically conducting mix, which, under low strain and in the cured state, has substantially the same mechanical characteristics as said first mix in the cured state, and, under high strain, has substantially the same mechanical characteristics as said second mix in the cured state.

According to one embodiment of the above tire, said third mix, in the green state, preferably has substantially the same viscosity as said second mix in the green state.

Moreover, said third electrically conducting mix of the above tire preferably comprises: a polymer system or formulation similar to that of said first mix, so as to manifest a similar abrasion resistance; a system of high-structure carbon black-based reinforcing fillers; said structure being defined by over 100 ml/100 gr absorption of dibutyl phthalate, and the carbon black being in quantities of over 30 phr (parts per 100 of polymer); an antioxidation system similar to that of said second mix; plasticizers and activating and curing systems as in normal tire mixes, and in such quantities as to achieve said mechanical characteristics under high and low strain.

BRIEF DESCRIPTION OF THE DRAWINGS

A number of non-limiting embodiments of the present invention will be described by way of example with reference to the accompanying drawings, in which:

FIGS. 1 and 2 show schematic axial sections of respective preferred embodiments of the tire according to the present invention.

FIG. 4 shows a schematic axial section of another non-limiting embodiment of the present invention.

DESCRIPTION OF THE PREFERRED EMBODIMENT

Figure 3:
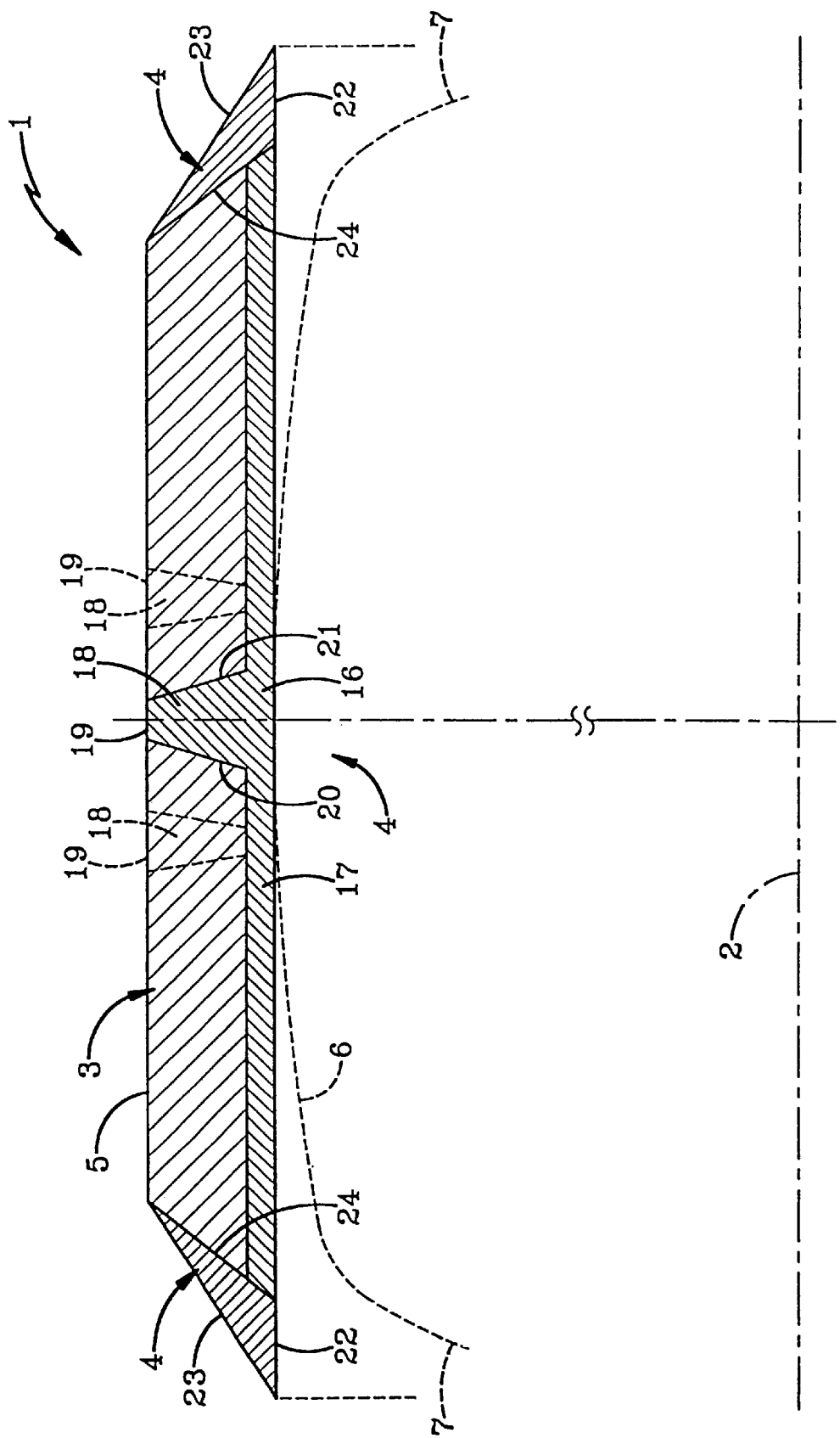
FIG. 3 shows a schematic axial section of another non-limiting embodiment.

Number 1 in FIG. 1 indicates a tire having an axis of rotation 2, and comprising an annular tread 3 comprising two lateral shoulders 4 on either side of tread 3 and an outer rolling surface 5.

Tire 1 also comprises a carcass 6 supporting tread 3 and comprising sidewalls 7, on to part of which shoulders 4 of the finished tire 1 are folded.

Shoulders 4 are of the so-called "high-volume" type, and are annular in shape with a rhomboidal section. More specifically, each shoulder 4 comprises an outer surface 8 defining part of rolling surface 5; an inner surface 9 parallel to surface 8; an outer lateral surface 10 sloping with respect to axis 2; and an inner lateral surface 11 contacting tread 3 and parallel to surface 10.

Tread 3 is formed from an electrically insulating "MP1" mix, shoulders 4 from an electrically conducting "MPC" mix, and sidewalls 7 from a normally electrically conducting "MP2" mix.

The annular electrically conducting element 8, includes shoulders 4 and further comprises a base 9 extending parallel to rolling surface 5 along the whole width of tread 3 and in contact with carcass 6, which is defined externally by a tread ply 9a (not shown) reinforced with metal wires (not shown).

Surface 8 of each shoulder 4 defines an electrically conducting lateral annular portion of rolling surface 5, and provides for establishing electrical contact between the tire and the road surface; and each shoulder 4 contacts respective sidewall 7, which forms a bridge element for electrically connecting the vehicle and shoulder 4.

As described in greater detail below, the conducting "MPC" mix is formed from polymers such as styrenebutadiene, butadiene and natural rubber, to which are added silica and carbon black, which has a structure ensuring over 100 ml/100 gr, and preferably over 120 ml/100 gr, absorption of dibutyl phthalate, and is present in quantities of over 30 phr (parts per 100 of polymer).

The phrase "normal tire mixes" refers to the fact that the "MPC" conducting mix and the "MP2" sidewall mix include polymer systems, reinforcing fillers, curing agents, activating agents and plasticizers that are commonly used in rubber compounding. Non-limiting descriptions of curing agents, activating agents and plasticizers that are normally used in the rubber compounding industry are set forth hereinbelow.

The "MPC" mix also comprises an antioxidation system similar to that of the "MP2" sidewall mix; and plasticizers and activating and curing systems as in normal tire mixes. The term "similar" refers to an antioxidation system having substantially the same components, and wherein the amounts of the components in the antioxidation system are in substantially the same amounts. Furthermore, the antioxidation system is included in the "MPC" conducting mix in substantially the same amounts as in the "MP2" sidewall mix.

In addition to the above components, the conducting "MPC" mix also comprises plasticizing oil, cross-linking substances, and other normal tire mix components. The phrase "normal tire mix components" refers to the fact that the "MPC" conducting mix further includes processing aids, cure accelerators, reinforcing fillers, waxes, and silane coupling agents. Non-limiting descriptions of cure accelerators, reinforcing fillers, waxes, and silane coupling agents that are normally used in the rubber compounding industry are set forth hereinbelow.

The "MPC" mix so formed has an electrical resistivity of less than $10^9$ ohms×cm, while the "MP1" mix of tread 3 has an electrical resistivity of over $10^{11}$ ohms×cm.

The "MPC" mix components are present in such quantities that the "MPC" mix, under low strain (1–50% elongation, more preferably less than 10% elongation) and in the cured state, has substantially the same rigidity as the "MP1" tread mix in the cured state, and, under high strain (50–100% elongation, more preferably 90–100% elongation), has a greater rigidity than the "MP1" mix in the cured state.

More specifically, the "MPC" mix components are present in such quantities that the "MPC" mix, under low strain and in the cured state, has the substantially the same mechanical characteristics, such as stiffness, as the "MP1" tread mix in the cured state, and, under high strain, has substantially the same mechanical characteristics, such as stiffness, as the "MP2" sidewall mix in the cured state.

Moreover, the "MPC" mix components are present in such quantities that, in the green state, the "MPC" mix has substantially the same viscosity as the "MP2" sidewall mix in the green state.

In the embodiment of FIG. 2, the shoulders 4 are replaced by so called "high-area" shoulders 12, each of which has a substantially L-shaped section, and comprises a tubular portion 13 extending along rolling surface 5 and defined externally by an annular surface 15 defining a respective annular lateral end portion of surface 5. Each shoulder 12 also comprises an annular flange 14 extending radially inwards from an outer edge of portion 13.

Shoulders 12 are formed from the "MPC" mix described hereinabove, and have substantially the same characteristics as tread 3 under low strain; while flanges 14, which perform a supporting function more typically of sidewalls 7, have a high degree of rigidity under high strain.

In the embodiment of FIG. 3, tread 3 incorporates an annular electrically conducting element 16, which comprises a base 17 extending parallel to rolling surface 5 along the whole width of tread 3 and in contact with carcass 6, which is defined externally by a tread ply (not shown) reinforced with metal wires (not shown). Conducting element 16 also comprises a central rib 18 extending perpendicularly to rolling surface 5, and having a surface 19 extending along rolling surface 5 and connected to base 17 by inclined sides 20 and 21 diverging towards the axis of rotation 2.

In a variation shown by the dotted lines in FIG. 3, element 16 comprises a number of lateral inserts 18, each of which is defined externally by a respective annular surface 19 defining a respective portion of surface 5.

Surface 19 defines a conducting strip extending along rolling surface 5, and which provides for establishing electrical contact between tire 1 and the road surface; while inclined sides 20 and 21 provide for improving grip between conducting element 16 and the "MP1" mix of tread 3.

Shoulders 4 are annular with a triangular section, and comprise a base 22 parallel to rolling surface 5, an outer surface 23 inclined with respect to axis 2, and an inner surface 24 contacting base 17 of conducting element 16 and inclined in the same direction as, but to a lesser degree than, surface 23, so as to intersect surface 23 at rolling surface 5.

Like shoulders 4, conducting element 16 is formed from an electrically conducting "MPC" mix, which comprises a polymer system similar to that of the "MP1" tread mix, so as to manifest a similar abrasion resistance or hardness, and a system of high structure carbon black-based reinforcing fillers. The abrasion resistance or hardness of a material is a measure of the ability of a material to withstand wear from its surface. The carbon black has a structure defined by over 100 ml/100 gr, and preferably over 120 ml/100 gr, absorption of dibutyl phthalate, and is present in quantities of over 30 phr (parts per 100 of polymer).

The "MPC" mix also comprises an antioxidation system substantially the same as that of the "MP2" sidewall mix; and plasticizers and activating and curing systems as in normal tire mixes.

The "MPC" mix so formed has an electrical resistivity of less than $10^9$ ohms×cm, while the "MP1" mix of tread 3 has an electrical resistivity of over $10^{11}$ ohms×cm.

The "MPC" mix components are present in such quantities that the "MPC" mix, under low strain (1–50% elastic elongation, more preferably less than 10% elastic elongation) and in the cured state, has substantially the same mechanical characteristics as the "MP1" tread mix in the cured state, and, under high strain (50–100% elastic elongation, more preferably 90–100% elastic elongation), has substantially the same mechanical characteristics as the "MP2" sidewall mix in the cured state.

Moreover, the "MPC" mix components are present in such quantities that, in the green state, the "MPC" mix has the same viscosity as the "MP2" sidewall mix in the green state.

Forming conducting element 16 and shoulders 4 from the same "MPC" mix greatly simplifies the extrusion process by enabling tires of good conductivity to be produced using only two mixes, i.e. "MP1" for tread 3, and "MPC" for conducting element 16 and shoulders 4.

In the embodiment of FIG. 4, base 17 of FIG. 3 is absent. In this embodiment, central insert 18 is in electric contact with tread belt, and sides of the central rib are substantially parallel to each other.

In general, the components that are utilized in rubber compounding include a polymer or mixture of polymers, reinforcing fillers, processing aids, a vulcanization system, which in includes vulcanization agent, activators and accelerators, and processing aids, such as plasticizers or oils.

The polymers are generally utilized as 100 parts of the rubber, which includes natural rubber, synthetic rubber and blends thereof. Such rubbers are well known to those skilled in the art and include synthetic polyisoprene rubber, styrene/butadiene rubber (SBR), including emulsion SBR's, polybutadiene, butyl rubber, neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like.

Generally, inert inorganic fillers are utilized in rubber compounding for reinforcement. The inert inorganic fillers utilized to reinforce rubber compounds of the present invention include carbon black, silica and mixtures thereof. According to the present invention, a useful range of reinforcing fillers i.e., silica and carbon black, is about 30 to 120 phr.

The carbon blacks may include any of the commonly available, commercially-produced carbon blacks but those having a surface area (EMSA) of at least 20 $m^2$/gram and more preferably at least 35 $m^2$/gram up to 200 $m^2$/gram or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in Table I hereinbelow.

TABLE I

Carbon Blacks

| ASTM Designation (D-1765-82a) | Surface Area ($m^2$/g) (D-3765) |
|---|---|
| N-110 | 126 |
| N-220 | 111 |
| N-339 | 95 |
| N-330 | 83 |
| N-351 | 74 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred.

As described hereinabove, amorphous silica (silicon dioxide) may be utilized as the sole inert inorganic reinforcing filler for the rubber compound of the present invention. Silicas are generally classified as wet-process, hydrated silicas because they are produced by a chemical reaction in water, from which they are precipitated as ultrafine, spherical particles.

These primary particles strongly associate into aggregates, which in turn combine less strongly into agglomerates. The surface area, as measured by the BET method gives the best measure of the reinforcing character of different silicas. For silicas of interest for the present invention, the surface area should be about 32 to about 400 $m^2$/g, with the range of about 100 to about 250 $m^2$/g being preferred, and the range of about 150 to about 220 $m^2$/g being most preferred. The pH of the silica filler is generally about 5.5 to about 7 or slightly over, preferably about 5.5 to about 6.8.

Silica can be employed in the amount of about 30 parts to about 120 parts by weight per 100 parts of rubber (phr), preferably in an amount from about 50 parts to about 90 parts per hundred rubber (phr). A particularly useful silica that can be utilized as the reinforcing filler in the rubber mixes of the present invention is Ultrasil™ VN3 (DeGussa Corporation; Germany). Some other commercially available silicas which may be used include: Hi-Sil™ 215, Hi-Sil™ 233, and Hi-Sil™ 190, produced by PPG Industries, and other commercial grades of different silicas are that commercially available from Rhone Poulenc, and J.M. Huber Corporation.

Recognizing that carbon black may be used as an additional reinforcing filler with silica, the total amount of reinforcing filler(s) in the vulcanizable elastomeric compounds of the present invention ranges between about 30 to 120 phr, all of which can comprise silica or carbon black, or mixtures of silica with carbon black within the foregoing ranges.

When silica is employed as a reinforcing filler, it is customary to add a silane e.g., bis[3-(triethoxysilyl)propyl] tetrasulfide, to obtain good physical properties in a cured rubber stock containing silica as a filler. This material is commonly added to silica filled rubber formulations, and will be referred to throughout this specification by one known industry recognized designation, Si69, or simply as a silane. Generally, the amount of silane that is added ranges between about 1 and 15 percent by weight, based upon the weight of silica filler present in the rubber compound.

As described hereinabove, a vulcanization system is included in the rubber mixes of the present invention. The vulcanization systems generally include vulcanization agents, activators and accelerators. The vulcanization agent may also be referred to as a curing agent or cross-linking agent.

With respect to the vulcanization agent, sulfur or sulfur vulcanizing agents or mixtures thereof are preferred, and are typically employed in the rubber mixes in amounts ranging from about 1 phr to about 10 phr by weight, although from about 1.5 phr to about 6 phr is more preferred. Generally, the rubber mixes can be vulcanized by any of the well known vulcanization systems, including the sulfur and sulfur-donor vulcanization systems noted hereinabove, as well as peroxide vulcanization systems and quinone-type vulcanization systems.

With respect to the sulfur vulcanization system, when used in rubber mixes used in this invention, sulfur is preferably employed in amounts of about 0.5 phr to about 6 phr, with about 1 phr to about 3 phr being more preferred.

In addition, the vulcanization system may provide one or more accelerators including, but not necessarily limited to, dithiocarbamate accelerators, including the metal dialkyldithiocarbamates such as, for example, zinc dibutyldithiocarbamate (ZDBDC), zinc diethyldithiocarbamate, zinc dimethyldithiocarbamate, and ferric dimethyldithiocarbamate; thiazole accelerators including 2-mercaptobenzothiazole, the benzothiazole disulfides such as, for example, mercaptobenzothiazole disulfide (MBTS); the benzothiazole sulfenamides, such as, for example, n-cyclohexyl-2-benzothiazole sulfenamide; and sulfenamide accelerators such as, for example, t-butyl-2-benzothiazyl sulfenamide (TBBS). Other useful accelerators which may be employed with rubber compositions include 2,2'-dibenzothiazyl disulfide, tetramethylthiuram disulfide, 4,4'-dithiomorpholine, dipentamethylene thiuram hexasulfide, tetramethylthiuram monosulfide, zinc o,o-dibutylphosphorodithioate, and the like. In a preferred embodiment, the rubber mixes uiltize mercaptobenzothiazole disulfide (MBTS) as the accelerator of vulcanization. In another preferred embodiment, the rubber mixes utilize a mixture of t-butyl-2-benzothiazyl sulfenamide (TBBS) and mercaptobenzothiazole disulfide (MBTS).

The vulcanization system may further include a vulcanizing activator that is present in an amount from about 2 to about 9 per hundred rubber (phr), and a vulcanizing accelerator that is present in an amount from about 0.8 to about 4 per hundred rubber (phr).

It will be appreciated that the foregoing accelerators are not exclusive, and that other vulcanizing agents known in the art to be effective in the vulcanization of the rubber formulations may also be utilized. For a list of additional vulcanizing agents, see *The Vanderbilt Rubber Handbook*, RT Vanderbilt Co., Norwalk, Conn. 06855 (1979).

In addition to the above rubber compounding components, vulcanization activators such as zinc oxide and stearic acid may optionally be added to and made a part of the rubber mixes. Amounts of these activators can vary depending upon processing needs, but it is conventional to add about 3 phr zinc oxide and about 2 phr stearic acid to the rubber mixes. Activators react with the vulcanization accelerators to increase the rate of vulcanization.

Processing aids or agents are commonly included in rubber compounding formulations to improve the flow and overall processing behavior of the rubber mixes. The process aids, which include softeners, extenders and plasticizers, and are included in the rubber mix to control the viscosity of the uncured rubber mix and to influence the hardness of the vulcanized rubber compound. The term "plasticizer", which commonly is a process oil, refers to a material that when added to a rubber provides internal lubrication during rubber compounding. The processing oil is included in an amount ranging from about 0 parts to about 80 parts process oil per 100 parts rubber (phr), preferably in an amount ranging from about 0 to 55 per 100 part rubber (phr). A preferred process oil is a aromatic oil, e.g. ESAR™ 90DEN (AGIP Petroli; Italy). As described above, stearic acid may be included in the rubber mixes as a vulcanization activator. It should be noted that stearic acid also acts as processing aid.

Other ingredients, such as antidegradants, may also be included in the rubber mixes. For example, additional conventional rubber compounding additives such as antioxidants, antiozonants and the like may be included in conventional amounts typically ranging from about 0.25 to about 4 phr.

The ingredients of the rubber mixes can be preferably admixed or compounded in a Brabender™ mixer or a type B internal mixer (such as a Banbury mixer), or any other mixer suitable for preparing viscous relatively uniform admixtures. When utilizing a type B Banbury internal mixer or a Brabender mixer, in a preferred mode, the dry or powdery materials (e.g., carbon black filler, silica filler, zinc oxide, stearic acid, etc.) are added into the mixing cavity first followed by any liquid process oil or softeners (e.g., process oil, plasticizers, etc.) and finally, the rubber components to create a masterbatch. The vulcanizing agents and vulcanizing accelerators are added to the masterbatch last.

As far as the viscosity is concerned, the quantities of the components of the "MPC" mix are to be chosen so as to keep the difference in percentage between the viscosities of the "MPC" mix and the "MP2" mix in the green state as follows, the viscosity, [ML(1+4)], being measured using a Mooney-viscometer test method as for ASTM D1646–96a with a large rotor at 100° C.:

$$[ML(1+4)_{MPC} - ML(1+4)_{MP2}]/ML(1+4)_{MP2} = G$$

with G being a percentage that is always less than 30%, and preferably less than 10%.

As far as the stiffness or modulus at low strain is concerned, the quantities of the compounds of the "MPC" mix are to be chosen so as to keep the difference in percentage between the stiffness or modulus at low strain (0.1 to 10%) of the "MPC" mix and the "MP1" mix in the cured state as follows, the modulus at low strain being measured using a dynamic mechanical test method as for ASTM D5992–96:

$$[G'_{MPC} - G'_{MP1}]/G'_{MP1} = S$$

where G' is the shear storage modulus between 0.1 to 10% of strain at a given frequency and at room temperature; and S is a percentage that is always less than 30% and preferably less than 10%.

When using a durometer hardness test method for the characterization of the difference of the hardness (HD)

between the first mix, MP1, and the conductive mix, MPC, at low strain and in the cured state, as for ASTM test method 2240–96:

$$[HD_{MPC}-HD_{MP1}]/HD_{MP1}=B$$

where HD is the Shore "A" hardness at room temperature and where B is a percentage that is less than 10% and preferably less than 5%.

As far as the stiffness or modulus at high strain is concerned, the quantities of the components of the "MPC" mix are to be chosen so as to keep the difference in percentage between the stiffness or modulus of "MPC" and "MP2" at high strain (100%) and in the cured state as follows, when using a tensile test method for characterization of stiffness or modulus at high strain, as for ASTM test method D412–97:

$$[M100_{MPC}-M100_{MP2}]/M100_{MP2}=C$$

wherein M100 is the modulus at 100% elongation; and C is a percentage always less than 30% and preferably less than 10%.

In general, the desired mechanical properties of the first, second and conductive mixes in the uncured ("green") state and in the cured state are set forth in Table II:

TABLE II

|  | MP1 | MP2 | MPC Preferred | MPC Maximum |
|---|---|---|---|---|
| Viscosity [ML(1 + 4) 100° C.] | 80 | 60 | <66 | <78 |
| G' (MPa, 1%, 1 Hz, R.T.) | 60 | 30 | 54–66 | 48–72 |
| Hardness (Shore A) | 70 | 55 | 74–66 | 77–63 |
| M100 (Mpa) 100 mm/min, R.T. | 2 | 1.4 | <1.7 | <2.1 |

EXAMPLES

To further illustrate the present invention, Table III shows non-limiting examples of the compositions of the first (MP1), second (MP2) and conductive mixes (MPC). The following examples are intended for illustrative purposes only, and should not be construed as limiting the scope of the present invention in any manner.

TABLE III

|  | MP1 | MP2 | MPC |
|---|---|---|---|
| SBR[1] | 40 | — | — |
| SBR[2] | 60 | — | — |
| SBR[3] | — | — | 80 |
| Butadiene Rubber | — | 60 | — |
| Natural Rubber | — | 40 | 20 |
| Silica | 70 | — | — |
| Silane | 7 | — | — |
| Carbon Black[4] | 7 | — | 55 |
| Carbon Black[5] | — | 35 | — |
| Wax | 1 | 2.5 | 2.5 |
| Stearic Acid | 1 | 3 | 2 |
| Aromatic Oil | 12 | 8 | 4 |
| Zinc Oxide | 1.7 | 5 | 3 |
| Sulphur | 2 | 1.5 | 1.4 |
| TBBS | 1 | 1 | 0.6 |
| MBTS | 0.5 | — | 0.3 |
| DPG | 1.5 | — | 0.2 |
| 6PPD | 1 | 5 | 5 |

SBR[1] = Europrene ™ S1721 (Enichem Elastomers; Italy)
SBR[2] = Duraprene ™ 753 (Firestone Polymers United States)
SBR[3] = Europrene ™ SOL 72510 (Enichem Elastomers; Italy)
Natural Rubber = TSR20 (Thaitech Rubber)
Silica = Ultrasil ™ VN# (DeGussa; Germany)
Silane = Si 69 (Degussa; Belgium)
Carbon Black[1] = Corax ™ N234 (DeGussa; Italy)
Carbon Black[2] = Corax ™ N330 (DeGussa; Italy)
Wax = Antiozonant Wax (Schumann Sasol GmbH Co KG; Germany)
Stearic Acid = Pristerene ™ 4934 (Unichema; Germany)
Aromatic Oil = Esar ™ 90DEN (AGIP Petroli; Italy)
Zinc Oxide = Zinox SRL (Italy)
Sulphur = ground sulphur (Solvay Barium Stronzium GmbH; Germany)
TBBS = Santocure ™ TBBS (Flexsys; Belgium)
MBTS = Perkacit ™ MBTS (Flexsys; Belgium)
DPG = Perkacit ™ DPG (Flexsys; United Kingdom)
6PPD = Santoflex ™ 6PPD (Flexsys; Belgium)

The viscosity in the green state and mechanical properties in the cured state of the MP1, MP2 and MPC mixes of Table III were measured and are reported in Table IV, below.

TABLE IV

|  | MP1 | MP2 | MPC | Difference |
|---|---|---|---|---|
| Viscosity [ML(1 + 4) 100° C.] | 75 | 43 | 50 | G = 16 |
| Stiffness G' (MPa, 1%, 1 Hz, R.T.*) | 42 | 13.5 | 34 | S = 19 |
| Hardness (Shore A) | 67 | 50 | 64 | B = 4.4 |
| Stiffness M100 (MPa; 100 mm/min, R.T*.) | 2.4 | 1.3 | 1.6 | C = 23 |

*R.T. = room temperature

Based on the foregoing disclosure, it is therefore demonstrated that the object of the present invention is accomplished by the antistatic tire described hereinabove. It should be understood that the selection of specific polymers, reinforcing fillers, process aids, vulcanizing agents, vulcanizing activators, vulcanizing accelerators, and antidegradants, as well as processing time and conditions for the rubber compounding, can be determined by one having ordinary skill in the art without departing from the spirit of the invention herein disclosed and described. It should therefore be appreciated that the present invention is not limited to the specific embodiments described above, but includes variations, modifications and equivalent embodiments defined by the following claims.

We claim:

1. An antistatic tire comprising a tread, two sidewalls, and two annular shoulders, each shoulder interposed between the tread and a respective said sidewall; the tread and the sidewalls being formed respectively from a first and second mix; and the tread defining part of a rolling surface, at least an annular portion of which is electrically conducting and has an electrical resistivity of less than $10^9$ ohms×cm; characterized in that said electrically conducting portion of the rolling surface is defined by at least a portion of an electrically conducting element, that is formed from a third electrically conducting mix, which under low strain and in the cured state, has substantially the same stiffness as said first mix in the cured state, and, under high strain, has substantially the same stiffness as said second mix in the cured state.

2. The tire of claim 1, wherein said electrically conducting element comprises a base, wherein said base extends parallel to said rolling surface along the entire width of said tread.

3. The tire of claim 1, wherein said electrically conducting element consists of shoulders.

4. The tire of claim 3, wherein each of said shoulders has an outer surface that defines a portion of the rolling surface.

5. The tire of claim 4, wherein each of said shoulders has a substantially rhomboidal section, one surface of which defines a respective annular part of said electrically conducting annular portion of said rolling surface.

6. The tire of claim 3, wherein each of said shoulders has a substantially L-shaped section and comprises a tubular portion extending along said rolling surface (5) and defined externally by an annular surface defining a respective annular part of said electrically conducting annular portion of said rolling surface.

7. The tire of claim 1, wherein said third electrically conducting mix, under low strain and in the cured state, has a stiffness which differs in percentage from the stiffness of said first mix in the cured state by less than 30 percent.

8. The tire of claim 7, wherein said third electrically conducting mix, under low strain and in the cured state, has a stiffness which differs in percentage from the stiffness of said first mix in the cured state by less than 10 percent.

9. The tire of claim 1, wherein said third electrically conducting mix, under high strain and in the cured state, has a stiffness which differs in percentage from the stiffness of said second mix in the cured state by less than 30 percent.

10. The tire of claim 9, wherein said third electrically conducting mix, under high strain and in the cured state, has a stiffness which differs in percentage from the stiffness of said second mix in the cured state by less than 10 percent.

11. The tire of claim 1, wherein said third electrically conducting mix has, in the green state, a viscosity which differs in percentage from the viscosity of the second mix, in the green state, by less than 30 percent.

12. The tire of claim 11, wherein said third electrically conducting mix has, in the green state, a viscosity which differs in percentage from the viscosity of the second mix, in the green state, by less than 10 percent.

13. The tire of claim 1, wherein said electrically conducting mix comprises:
   100 parts of a rubber;
   from about 30 to about 120 parts per hundred rubber (phr) of an inorganic filler;
   from about 0 to about 80 parts per hundred rubber (phr) of a process aid; and
   from about 1 to about 10 parts per hundred rubber (phr) of a vulcanizing system.

14. The tire of claim 13, wherein said inorganic filler is selected from the group consisting of carbon black, silica and mixtures thereof.

15. The tire of claim 14, wherein said carbon black has a structure defined by over 100 ml/100 g absorption of dibutyl phthalate.

16. The tire of claim 15, wherein said carbon black has a structure defined by over 120 ml/100 g absorption of dibutyl phthalate.

17. The tire of claim 13, wherein said process aid is a plasticizer.

18. The tire of claim 17, wherein said plasticizer is an aromatic oil.

19. The tire of claim 13, wherein said vulcanizing system further comprises a vulcanizing agent, at least one vulcanizing activator and at least one vulcanizing accelerator.

20. The tire of claim 19, wherein said vulcanizing agent is present in an amount from about 1 to about 10 per hundred rubber (phr).

21. The tire of claim 19, wherein said vulcanizing activator is present in an amount from about 2 to about 9 per hundred rubber (phr).

22. The tire of claim 19, wherein said vulcanizing accelerator is present in an amount from about 0.8 to about 4 per hundred rubber (phr).

23. The tire of claim 13, wherein the difference between the hardness of the third electrically conducting mix, in the cured state, and the hardness of the first mix, in the cured state, is a percentage that is less than 10%.

24. The tire of claim 13, wherein the difference between the hardness of the third electrically conducting mix, in the cured state, and the hardness of the first mix, in the cured state, is a percentage that is less than 5%.

25. The tire of claim 1, wherein said electrically conducting element comprises said shoulders and an electrically conducting member having an annular surface defining part of said rolling surface and being inserted inside the tread; said electrically conducting member and said shoulders being both formed from said third electrically conducting mix.

26. The tire of claim 25, wherein said electrically conducting member comprises at least one annular body having a substantially polygonal section with sides, said sides form angles other than right angles with said rolling surface.

27. The tire of claim 26, wherein said electrically conducting member is located inside the tread and comprises a base contacting the shoulders, and at least one annular insert projecting from said base and defined externally by said annular surface.

28. The tire of claim 27, wherein said electrically conducting member comprises at least two annular inserts projecting from said base and defined externally by respective said annular surfaces.

* * * * *